(12) United States Patent
Buettner

(10) Patent No.: US 7,307,227 B2
(45) Date of Patent: Dec. 11, 2007

(54) CIRCUIT-BREAKING DEVICE

(75) Inventor: Alex Buettner, Roedental (DE)

(73) Assignee: Woehner GmbH & Co. KG Elektrotechnische Systeme, Roedental (DE)

( * ) Notice: Subject to any disclaimer, the term of this patent is extended or adjusted under 35 U.S.C. 154(b) by 0 days.

(21) Appl. No.: 10/545,575

(22) PCT Filed: Feb. 13, 2004

(86) PCT No.: PCT/EP2004/001375

§ 371 (c)(1),
(2), (4) Date: Jul. 6, 2006

(87) PCT Pub. No.: WO2004/073127

PCT Pub. Date: Aug. 26, 2004

(65) Prior Publication Data

US 2006/0243569 A1    Nov. 2, 2006

(30) Foreign Application Priority Data

Feb. 17, 2003  (DE) ................... 103 06 548

(51) Int. Cl.
*H01R 13/00*  (2006.01)
(52) U.S. Cl. ............. 200/51.11; 439/701; 439/709
(58) Field of Classification Search ............. 200/51 R, 200/51.01–51.14; 439/701, 709, 626, 638, 439/715

See application file for complete search history.

(56) References Cited

U.S. PATENT DOCUMENTS

| | | | |
|---|---|---|---|
| 4,636,020 A * | 1/1987 | Marmillion | 439/595 |
| 5,196,987 A * | 3/1993 | Webber et al. | 361/624 |
| 5,762,182 A * | 6/1998 | Faber | 200/401 |
| 6,036,542 A | 3/2000 | Marshall et al. | |
| 6,229,692 B1 * | 5/2001 | Stendardo et al. | 361/627 |
| 6,560,123 B1 * | 5/2003 | de Varennes et al. | 361/807 |

FOREIGN PATENT DOCUMENTS

| | | |
|---|---|---|
| DE | 19525438 A1 | 1/1997 |
| EP | 0762581 A | 3/1997 |
| EP | 1065683 A | 1/2001 |
| EP | 1251538 A | 10/2002 |
| FR | 2590416 A | 5/1987 |
| WO | WO 02/50855 A | 6/2002 |

\* cited by examiner

*Primary Examiner*—Elvin Enad
*Assistant Examiner*—M. Fishman
(74) *Attorney, Agent, or Firm*—Sughrue Mion, PLLC

(57) ABSTRACT

The invention relates to a circuit breaker device comprising a bottom switch part (2) that can be brought into electrical contact with bus bars, a top switch part (1) which can be placed onto the bottom switch part (2) and is provided with at least one fuse link, switch module, contactor or similar, and a terminal module (3) for especially at least one outgoing feeder (42). The bottom switch part (2) is provided with contact elements (5, 6, 7) that are in electrical contact with the bus bars (9, 10, 11) and can be contacted in a contact-proof manner by means of plug-in contacts (17, 18, 19) of the top switch part (1) via one respective access slot (12, 13, 14) located in a top area of the bottom switch part (2). The terminal module (3) is pivotally mounted (50) on the side of the top switch part (1) of bottom switch part (2) and is provided with electrical contacts (38, 39, 40) that can be laterally inserted into the top switch part (1) and are allocated to each outgoing feeder (42).

28 Claims, 9 Drawing Sheets

CIRCUIT-BREAKING DEVICE

BACKGROUND OF THE INVENTION

The invention relates to a circuit-breaking device and to a safety switch or motor protection switch.

Circuit-breaking devices are used as safety switches, motor protection switches and are in general used with a so-called adapter part placed upon current busbars as a completely separate element. The adapter part serves to be clamped onto the current busbars, and as a carrier module for the different circuit-breaking devices.

Adapters or current bus bar adapters, wherein the adapter part serves to be clamped on the current busbars including a carrier module for the different circuit-breaking device are known from EP 0 762 581. The current linkage between the current bus bars and the circuit breaking devices is accomplished by electrically connecting contact parts with the respective circuit-breaking devices by means of connection lines.

A drawback of the known systems resides in that the adapters have to be affixed on the current busbars as additional components and provided with connection lines or connection contacts, and that the circuit-breaking devices have to be mounted on the adapters as separate elements and have to be electrically connected with the connection lines or the connection contacts. If a circuit-breaking device is exchanged or dismounted, it is required that the outgoing conductors are removed from the respective circuit-breaking device and are reconnected subsequently. In addition, the circuit-breaking device is to be detached with respect to the adapter part prior to the disassembly, and the new circuit-breaking device is to be mounted after the exchange. If required, the current buses even have to be switched to be currentless.

The invention is based on the object to provide a circuit-breaking device which is easy to affix onto current busbars and which may be exchanged without the removal of outgoing conductors.

According to the invention this object is achieved by the features defined in patent claim 1. Additional embodiments of the invention are defined in the dependent claims.

BRIEF SUMMARY OF THE INVENTION

The invention provides for a circuit-breaking device which, for example, consists of three components representing one integrated unit and which can be placed upon and interlocked with current busbars in an easy and fast manner. In a preferred embodiment a pivoted connection module is provided on the lower switch part, which may be unlocked from the operating position with mechanical means, e.g. a screwdriver, be unlocked from operating position, be pivoted back subsequently and, as result of its pivoting movement, brings locking or latching mechanism mechanically clutched with the connection module into a released position so as to allow an exchange of the circuit breaker in form of an upper switch part. Upon exchanging the circuit breaker or the upper switch part respectively, the unit may be reassembled in a reversed manner, and upon pivoting the connection module in a manner opposite to the opening movement the upper switch part, the lower switch part and the connection module are interlocked. The interlocking of the circuit-breaking device with respect to the current busbars is preferably accomplished in a conventional manner. Here it is not necessary that the current buses be made currentless or outgoing conductors be disconnected.

The circuit-breaking device according to the invention, preferably a three-pole circuit-breaking device, can advantageously be conceived to be narrow-sized. The outgoing conductors are affixed in the connection module in a touch-safe manner such that the connection module has contacts facing in the direction of the upper switch part and engaging into the upper switch part. Upon opening the connection module by laterally pivoting it away from the upper switch part the current flow toward the consumer connected to the outgoing conductors is interrupted and the contacts of the connection module facing toward the upper switch part are likewise currentless.

Both the upper switch part and the lower switch part comprise separate housings. The upper switch part has opening slots or openings in the surface of the housing facing upwardly for plug contacts to be plugged into the same, which project from the upper switch part out of the housing in a downward direction. This means that the lower switch part is touch-safe when the upper switch part is withdrawn, as the contact elements are covered by the housing.

In a preferred embodiment the circuit-breaking device according to the invention may be exchanged such that upon unlocking the connection module with a screwdriver or the like with respect to the upper switch part the connection module can be pivoted away from the upper switch part. By the pivoting movement of the connection module a mechanical locking means mechanically clutched with the connection module is unlocked with respect to the upper switch part, which allows the withdrawal of the upper switch part from the lower switch part.

In another embodiment the upper switch part is provided with lateral openings through which an electrical contact towards contact counter-tongues located inside the housing is possible by means of contact tongues or the like. All upper parts of the switch comprise corresponding contact openings at the same height and with the same width, so that it is possible to electrically connect two or more of such upper parts of the switch with each other so that, for example, a motor protection switch/contactor combination is possible with the use of two of such circuit-breaking devices lying parallel to each other. The lateral circuit-breaking device contacting also allows a combination as a motor starter combination.

BRIEF DESCRIPTION OF SEVERAL VIEWS OF THE DRAWINGS

Below, a preferred embodiment of the circuit-breaking device according to the invention will be described in order to explain additional features and advantages, wherein.

DETAILED DESCRIPTION OF THE INVENTION

Figure 1:
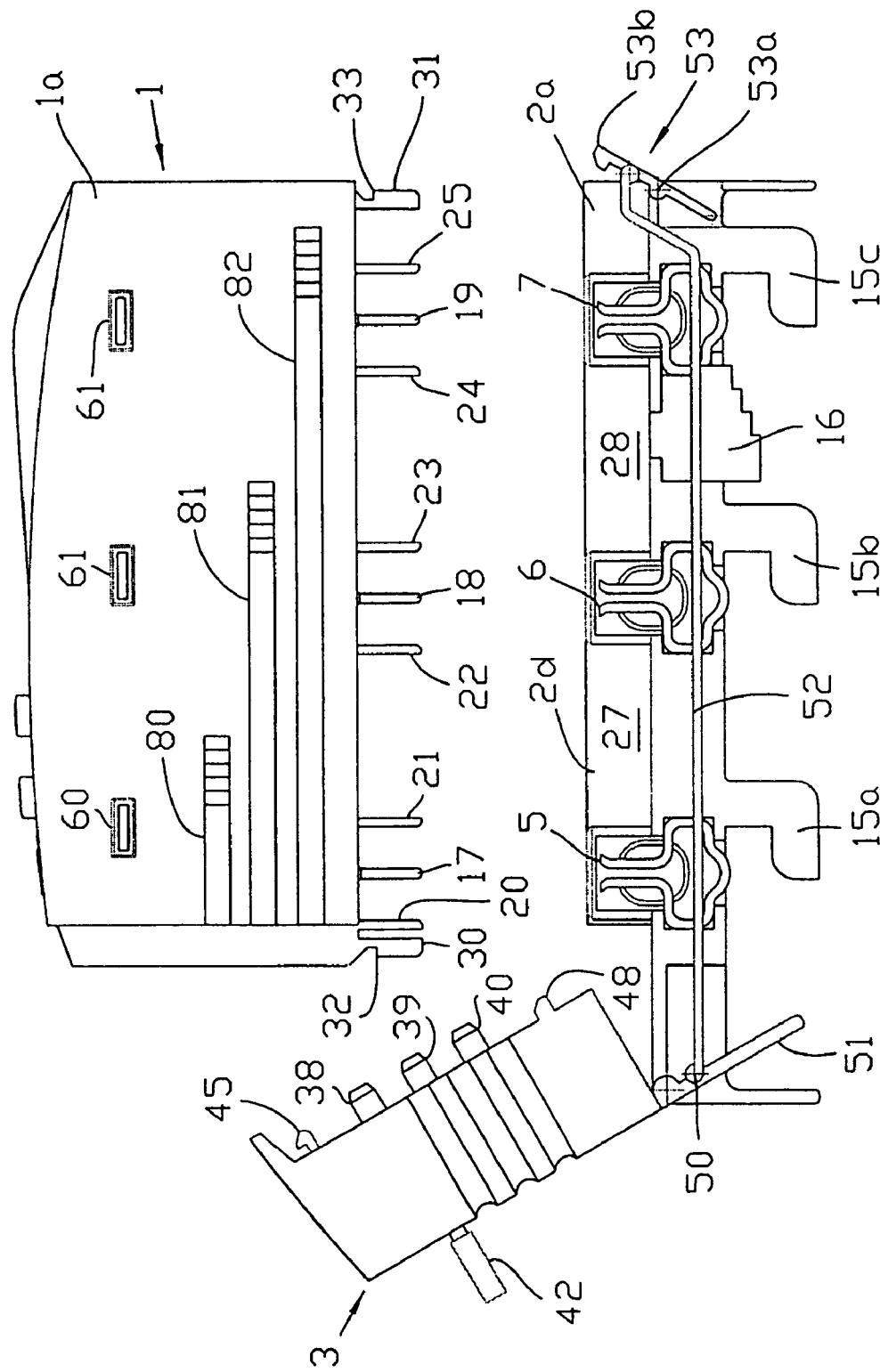
FIG. 1 shows a lateral view of a circuit-breaking device with a partially cut open representation of the lower switch part.
Figure 2:
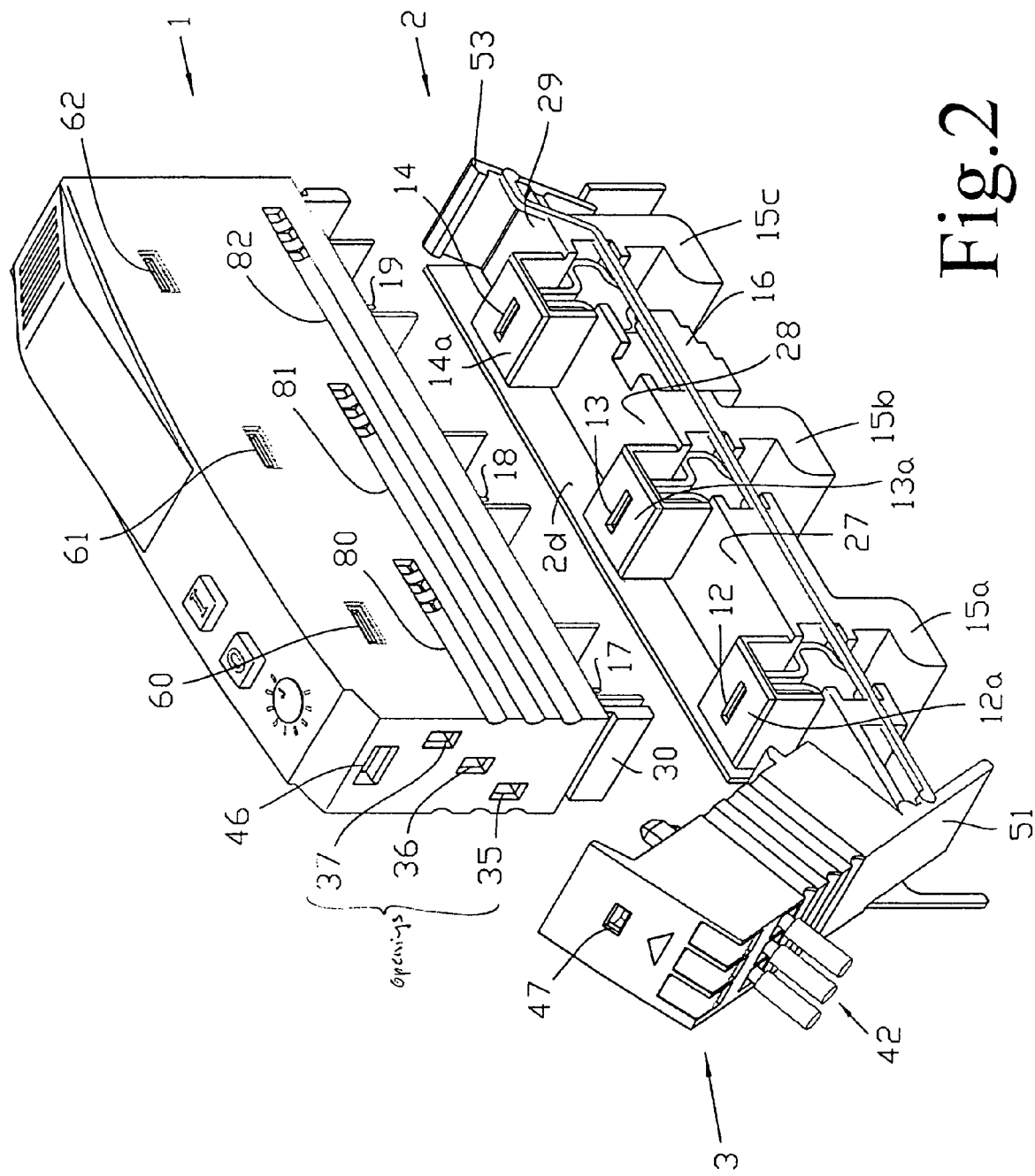
FIG. 2 shows a perspective view of the circuit-breaking device of FIG. 1.

FIG. 1 shows a lateral view of the circuit-breaking device according to the invention formed of an upper switch part 1, a lower switch part 2 and a connection module 3. FIG. 2 shows a schematic perspective view of the circuit-breaking device according to FIG. 1, and FIG. 3 shows a view in correspondence with FIG. 1 together with the current busbars, wherein the lower switch part 2 in FIG. 1, and also in FIG. 2 and FIG. 3, is laterally cut open.

Both the upper switch part 1 and the lower switch part 2 each comprise a separate housing designated with 1a and 2a, each of them including contacts, fuse links or contactors, respectively, or the like in a touch-safe manner, which are located inside respective the switch parts.

Figure 3:
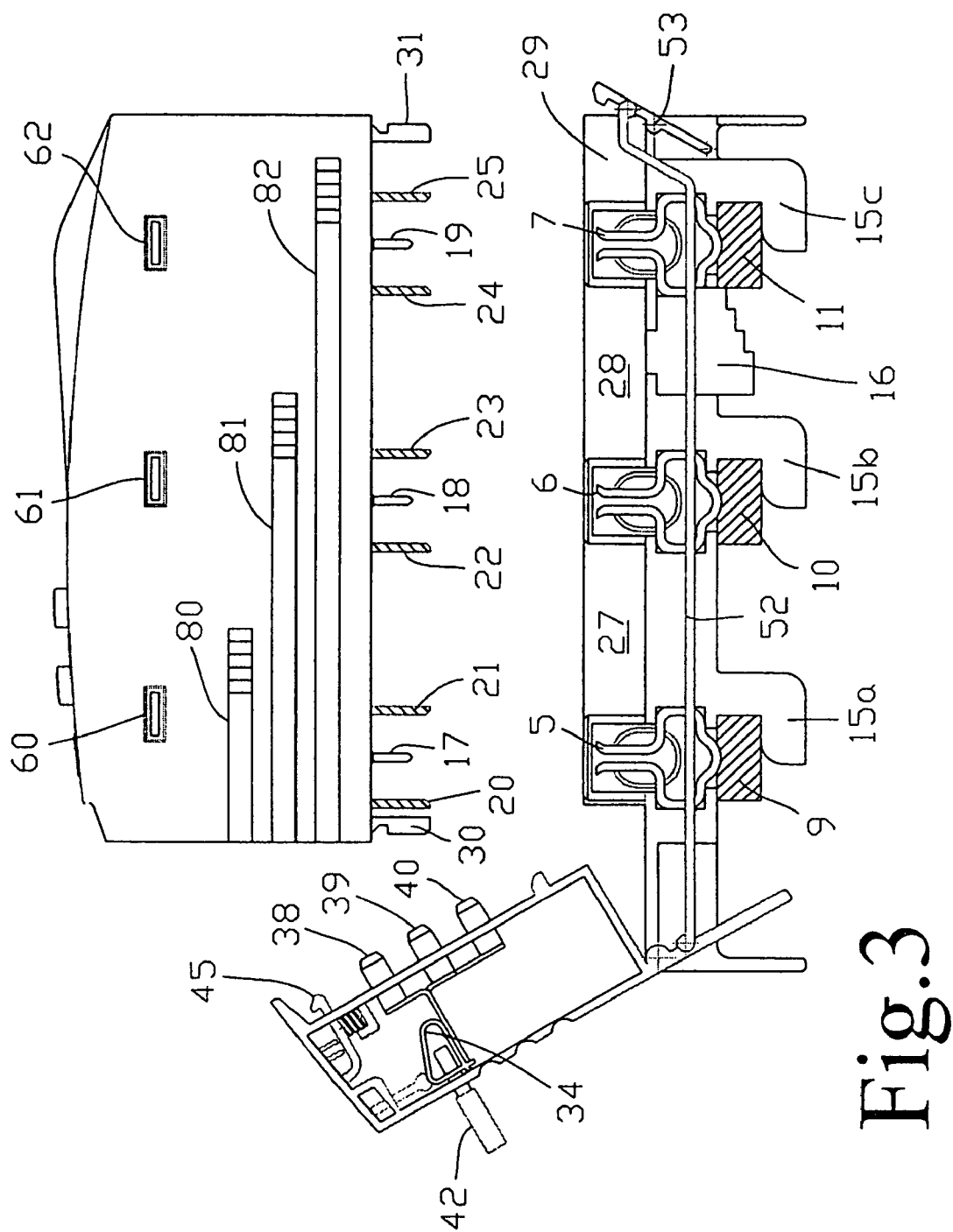
FIG. 3 shows a view substantially in correspondence with FIG. 1, with current busbars, wherein the connection module is laterally cut open.

As is shown in FIGS. 1 to 3, an arrangement of contact elements 5, 6, 7 is provided in the lower switch part 2, which project over the lower surface of the housing 2a as to obtain an electrical contact with the current busbars 9, 10, 11 as soon as the circuit-breaking device is placed upon the busbars 9, 10, 11. For their attachment on the busbars 9, 10, 11 each lower switch part 2 comprises correspondingly designed feet 15a, 15b, 15c known per se, as well as at least one locking tongue or locking means 16 ensuring an attachment of the circuit-breaking device at least with respect to busbar 11. Thus, the switch is permanently and safely held with respect to the current busbars 9, 10, 11.

According to FIG. 2 the lower switch part 2 is provided with slots or openings 12, 13, 14 on its upper surface or side respectively, which serve to allow corresponding contact tongues or plug contacts 17, 18, 19 (FIG. 1) projecting from the lower surface of the lower switch part 1 downwardly to be brought into an electrical contact with the contact elements 5, 6, 7 (see FIG. 1) via the openings 12, 13, 14 (FIG. 2).

According to the embodiment shown in the figures guides or feet 20 to 25 are provided laterally of the plug contacts 17, 18, 19, which are made of an insulation material such as a synthetic material and which may be arranged as integral components on the housing 1. Said feet 20, 21 and so on simultaneously form a lateral protection of the plug contacts 17 to 19, but basically have a guiding function so as to ensure that the upper switch part 1 be purposefully placed upon the lower switch part 2. In correspondence therewith the lower switch part 2 includes sparings or recesses 27, 28, 29 adjusted to and matching with the distance of the feet 20, 21 and 22, 23 and 24, 25 respectively in view of their width, i.e. transversely to the course of the current busbars, so as to ensure that the upper switch part 1 be exactly placed upon the lower switch part 2 and that the plug contacts 17, 18, 19 be exactly inserted into the corresponding contact slots 12, 13, 14.

With respect to the upper surface of the housing, the contact elements 5, 6, 7 with the openings 12, 13, 14 are downwardly offset inside the lower part 2 of the circuit breaker to an extent that a touch of the contact elements 5, 6, 7 is safely prevented once the upper switch part 1 is withdrawn from the lower switch part 2.

Moreover, counter-locking elements 30, 31 are provided on the upper switch part 1, e.g. in the form of brackets with locking openings 32, 33 facing outwardly, as are shown in FIG. 1 et seq. and the purpose of which will be described below.

The contacts 17, 18, 19 are connected with corresponding sides of a motor contactor, a safety unit and the like, the other sides or poles of which being electrically connected with contact sockets or contacts respectively, which are located inside contact openings 35, 36, 37, wherein said contacts or contact sockets are not illustrated in the figures in more detail. In the embodiment as shown in FIG. 2 the openings 35, 36, 37 are preferably provided in a laterally offset or diagonally extending manner. However, they may also be disposed in a row one above the other, and so may the contacts located in the same.

Contact tongues 38, 39, 40 are associated with the contact openings 35, 36, 37, project laterally from the connection module 3 in the direction towards the upper switch part 1 and are formed or arranged on the connection module in correspondence with the arrangement of the openings 35, 36, 37. According to a preferred embodiment each connection module 3 comprises one spring-type terminal 34 per outgoing conductor 42. In this respect reference is made to FIG. 3. Inside the connection module 3 the contact tongues 38, 39 40 are connected with a spring clip, a spring-type terminal 34 or another means for a permanent reception of connection cables 42, wherein only one single connection cable 42 is shown in the figures.

It can be seen that with current-carrying busbars 9, 10, 11 the contacts 5, 6, 7 are at least partially energized, but are covered by the housing 2a in a touch-safe manner, even if the upper switch part 1 is withdrawn in accordance with FIG. 1. The contact tongues 38, 39 40 of the connection module 3 are likewise not current-carrying as soon as the connection module 3 adopts the inoperative position shown in FIGS. 1 to 3.

In the operating state and in the as-delivered state, however, the upper switch part 1 sits tightly on the lower switch part 2. Moreover, in contrast to the representation of FIG. 1, the connection module is pivoted clockwise and is laterally adjacent to the upper switch part 1 and the lower switch part 2 such that the contact tongues 38, 39 40 are inserted practically horizontally and in alignment with the upper switch part 1 into the same and are electrically connected with the correlating contact elements in the upper switch part 1. Thus, in the operating state, the upper switch part 1, the lower switch part 2 and the connection module 3 form a permanently connected unit.

The connection module 3 is moreover provided with a detachable locking or latching means 45, e.g. in the form of a hook 45 adjustable with a screwdriver or the like, which engages into an associated locking opening 46 in the upper switch part 1 when the connection module 3 adopts its operating position adjacent to the upper switch part 1. In the embodiment as illustrated, the locking tongue 45 may be moved downwardly with a screwdriver, which may be inserted through an opening 47 formed on the upper side of the connection module, so as to be released from the opening 46 and so as to displace the connection module 3 clockwise into the position as shown in FIG. 1 to 3 subsequently.

As it is additionally shown in the figures, the connection module 3 according to the embodiment as shown is provided with a locking tooth 48. In the operating state this locking tooth or the locking rib 48 engages into an outwardly facing recess 32 of a bracket 30 projecting downwardly from the upper switch part 1, as was described already above. This secures the upper switch part 1 of the circuit-breaking device against a movement away from the lower switch part 2 in the operating state, at least in the region of the connection module 3, while the connection module 3 itself is locked by the locking means 45 with respect to the upper switch part 1. As it is shown in FIGS. 1 and 2, the connection module 3 is pivotably mounted with respect to the lower switch part 2 along an axis 50 and, according to a preferred embodiment, comprises a downwardly elongated bracket 51. The bracket 51 has an articulated relationship with a lever 52 controlling a locking flap or locking tooth 53 such that, when pivoting the connection module 3 counter-clockwise, the locking flap 53 is pivoted clockwise about an axis 53*a* and thus releases the upper switch part 1. In the operating state of the circuit-breaking device the locking flap 53 is engaged by a bracket 31 provided with an outwardly facing opening 33, as was described above, into which, again, the tooth 53*b* of the locking flap 53 engages when the connection module 3 adopts its operating position.

The above-described locking means or latching means consisting of elements 30, 32, 48, 52, 53, 53*b*, 31 and 33 ensures a fixation and locking of the upper switch part 1 with respect to the lower switch part 2.

It can be seen that the connection module 3 may also be pivotably mounted on the upper switch part, and a locking with respect to the lower switch part 2 may kinematically be accomplished in an opposite manner.

Figure 4:
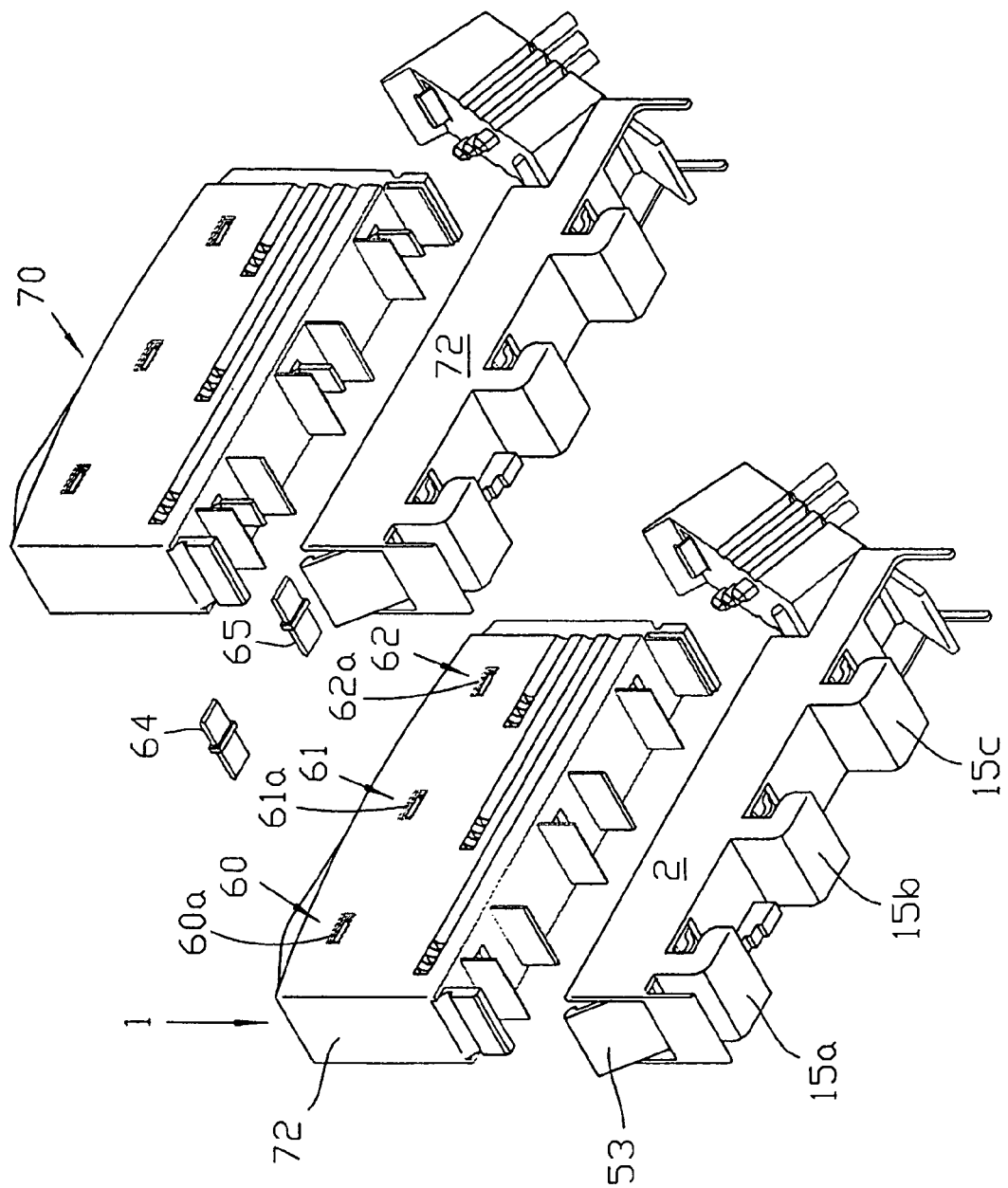
FIG. 4 shows two circuit-breaking devices for explaining a combination formed of two of such units.

According to another embodiment the upper switch part 1 is provided with lateral openings 60, 61, 62. Contacts 60*a*, 61*a*, 62*a* (FIG. 4) are provided in said openings or slots 60, 61, 62 which serve to have an electric contact produced to an adjacent circuit-breaking device. This possible combination may, for example, be desired if—instead of one single circuit-breaking device—a combination of one circuit breaker and one contactor or a so-called reversible contactor combination consisting of a circuit breaker, a contactor and a reversible contactor is desired. With respect to a switch-contactor combination this will hereinafter be explained by means of FIG. 4. If, for example, two circuit-breaking devices according to FIG. 4 are used, both circuit-breaking devices are connected with each other by means of the contacts 60*a*, 61*a*, 62*a* and corresponding contact tongues 64, 65 which are brought into an electric contact with the contacts 60*a*, 61*a*, 62*a* of the adjacent circuit-breaking device 70 facing the same. In this case the contacts 17, 18, 19 with respect to the upper switch part designated with 1 in FIG. 4 are removed from the underside of the circuit-breaking device, as is suggested in FIG. 4, while the circuit-breaking device 70 is provided with corresponding contacts 17, 18, 19 for contacting the current busbars.

In other respects, both elements 1 and 70 respectively, as well as the lower switch part 2 and 72 respectively, preferably have the same configuration.

According to a preferred embodiment it is provided that the plug contacts 17, 18, 19 are arranged to be removable from the underside of the upper switch part 1 and, in correspondence with the use shown in FIG. 4, can be used as contact tongues when laterally pushed into the opening 60, 61, 62.

Figure 5:
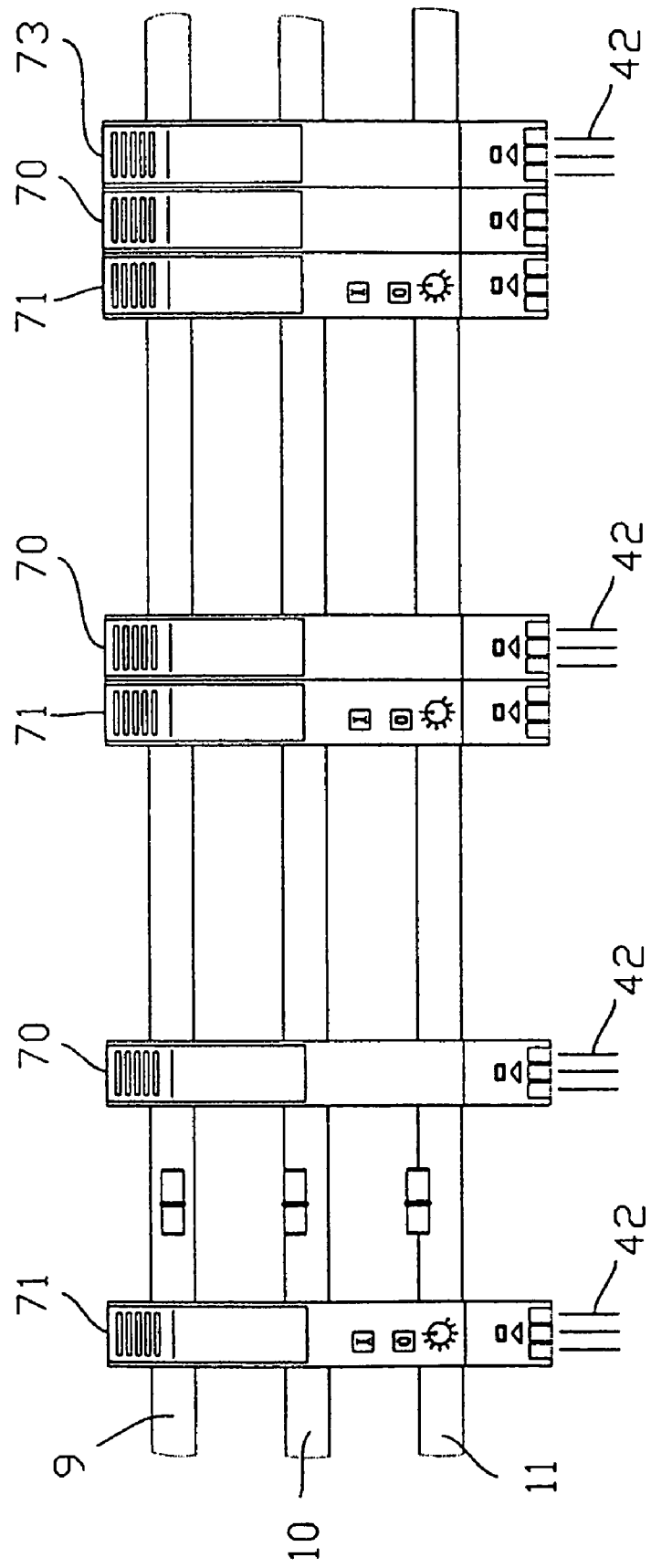
FIG. 5 shows schematic views of different combination units on the basis of the circuit-breaking device according to the invention.

FIG. 5 shows the use of the circuit-breaking device according to the invention as a motor protection switch or as a contactor. The application of two of such circuit-breaking devices with corresponding electrical connections is used as a switch-contactor combination, while the application of three of such units with a correspondingly modified contacting is used as a reversible contactor combination.

FIG. 5 shows in detail as FIG. 5*a* a representation wherein the circuit-breaking device according to the invention is used as a motor protection switch, i.e. the circuit-breaking device is electrically connected with the current busbars 9, 10, 11 via the lower switch part and the outgoing conductors 42 are connected with the motor not further illustrated.

According to FIG. 5*b* the circuit-breaking device serves as a contactor, i.e. the outgoing conductors 42 are connected with the non-illustrated consumer in the form of a motor. In FIG. 5*c*, a double combination is used, i.e. two circuit-breaking devices are provided whereof the right one in FIG. 5*c* acts as a contactor and is designated with 70, while the preconnected switch acts as a circuit breaker being in electrical contact with the current busbars while the contactor 70 is not in an electrical contact with the current busbars 9, 10, 11, but whereof the outgoing conductors 42 lead to the subsequently connected motor or consumer respectively.

FIG. 5*d* shows three circuit-breaking devices arranged side by side in the form of a reversible contactor combination, i.e. with a circuit breaker 71, a contactor 70 and a reversible contactor 73 which comprises the outgoing conductors 42 leading to the consumer or motor respectively. Accordingly, the two devices arranged adjacent to each other in FIG. 5*c* are connected with each other by lateral contacts explained in FIG. 4, in which they are shown by the contact tongues 64, 65, namely to ensure the operation of each individual unit. This means, in other words, that three contact tongues are provided between each device, as is explained in connection with FIG. 4. Correspondingly, the three circuit-breaking devices according to FIG. 5*d* are connected with each other by means of such contact tongues.

As is shown in the above description, the circuit-breaking device according to the invention may be used as contactor and as reversible contactor or safety switch and preferably is of a narrow construction due to the compact design, wherein several of such circuit-breaking devices can be provided next to each other with a correspondingly differently designed contacting. The outgoing conductors are clamped in a touch-safe manner in a separate connection module 3 being in an operating communication with the circuit-breaking device.

For the purpose of exchanging the upper switch part 1 due to a defect or for other reasons the upper switch part 1 can easily be exchanged with respect to the lower switch part 2 upon correspondingly releasing the connection module 3, whereupon the new upper switch part 1 can again be placed onto the same.

The circuit-breaking device according to the invention is constructed such that the electro-mechanical components, in as far as the upper switch part 1 and the lower switch part 2 are concerned, are provided to be lying on top of each other and that the connection module 3 for the outgoing conductors is laterally articulated to be pivotable with respect to the upper switch part 1 and the lower switch part 2. This ensures that the entire unit including said three components can easily and quickly be clipped onto the current busbars in one go while a common locking mechanism in connection with the clamping feet 15*a*, 15*b*, 15*c* (FIG. 1) is maintained, wherein the locking mechanism, e.g. in the form of the locking teeth 16, effects a clamping or retaining effect with respect to the current busbars 9, 10, 11. Even in this state can the lower switch part 2 and the connection module 3 remain where they are when an exchange of the upper switch part 1 is required, by opening—in accordance with the above description—the connection module 3 with respect to the locking means 45 and with respect to the entire unit, whereupon a second locking unit then allows a removal of the upper switch part 1 with respect to the lower switch part 2 by means of the control rod or the control lever 52. Once a new upper switch part 1 has been mounted, this mechanical locking mechanism, consisting of the elements 30, 32, 48, 52, 53, 53b, 31, 33, again allows an automatic locking with respect to the lower switch part 2 due to a pivoting movement of the connection module during the pivoting movement thereof clockwise.

During the phase of exchanging the upper switch part 1 the busbar system 9, 10 11 remains protected against contact by the lower switch part 2 remaining on the same, and there is no need to disconnect the other consumers provided on the busbar system.

According to another embodiment the upper switch part 1 is equipped with ventilation channels 80, 81, 82 which—in a sectional view—are preferably formed semi-circular and communicate with the corresponding ventilation channels of adjacent circuit-breaking devices, and which, with circuit-breaking devices arranged directly next to each other, result in circular ventilation channels extending in horizontal directions, i.e. parallel to the current busbars 9, 10, 11, so that the hot air dissipation is ensured on the front side of the circuit-breaking devices, namely on the face where all ventilation channels are lead towards the outside. In addition, one or more ventilation holes may be provided also above each circuit-breaking device, as is shown by reference numeral 84 in FIG. 2.

The formation of the locking units as described moreover ensures that an unintended removal or an unintended disassembly of the entire circuit-breaking device and a contact with the current-carrying current busbars is prevented.

Both in FIG. 1 and FIG. 2 the lower switch part 2 is shown in a partially cut open view.

It can be inferred, for example, from FIG. 2 that, due to the structure of the housing in the area of slots 12, 13, 14, the associated contacts 5, 6, 7 are closed on the sides and on the top by the housing sections 12a, 13a, 14a, i.e. they are designed to be insulated such that the connection contacts 17, 18, 19 (FIG. 1) may be electrically connected with the contacts 5, 6, 7 via said slots 12, 13, 14 while, when the upper switch part 1 is withdrawn, said contacts 5, 6, 7 are enclosed by the housing sections 12a, 13a, 14a in an insulated manner. The height of these housing sections 12a, 13a, 14a preferably corresponds to the height of a side wall designated with 12d. The side wall preferably extends over the entire length of the lower switch part 2, as can be seen in FIGS. 1 and 2.

Figure 6:
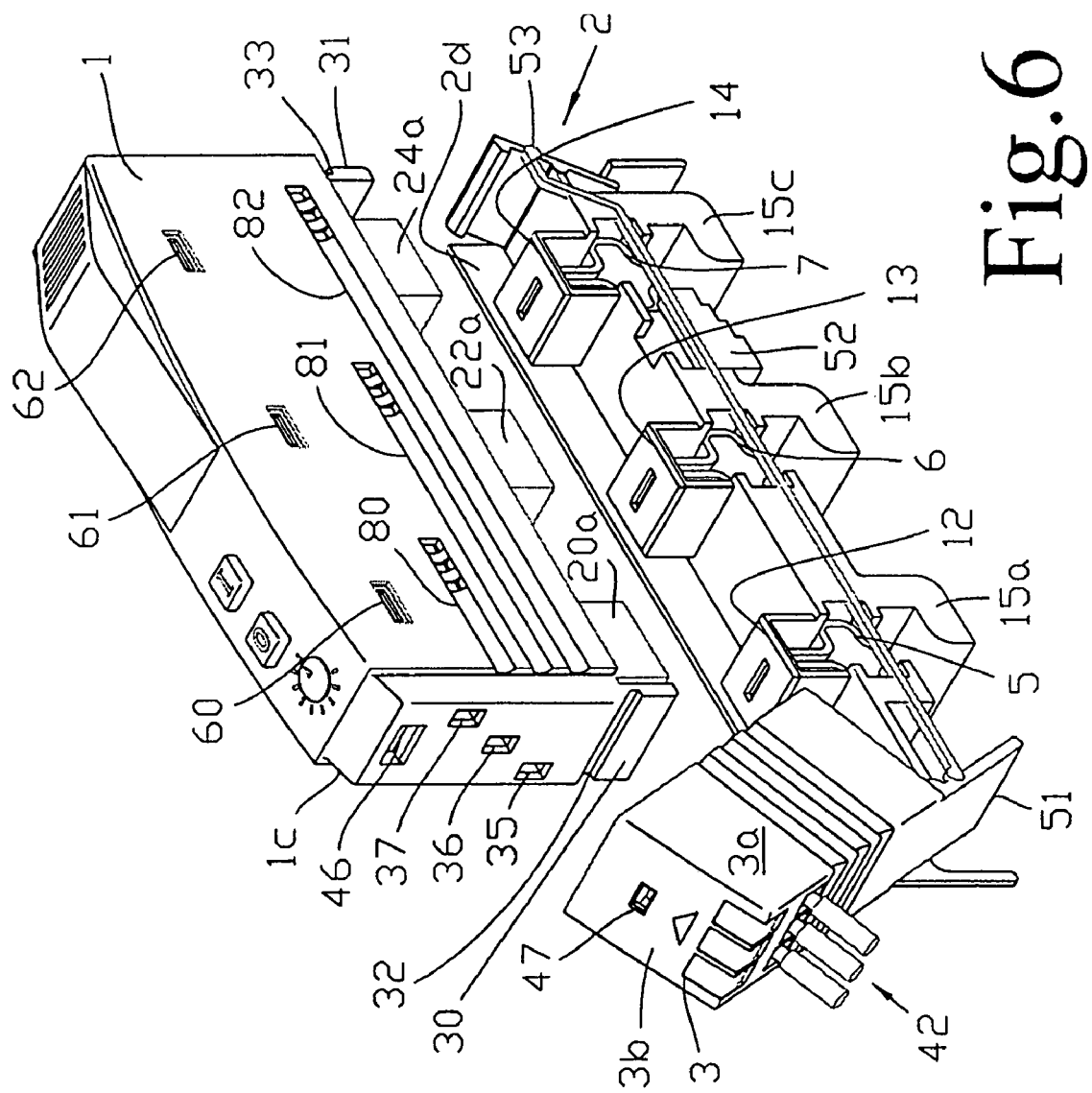
FIG. 6 shows a perspective view of the circuit-breaking device in correspondence with FIG. 2.
Figure 7:
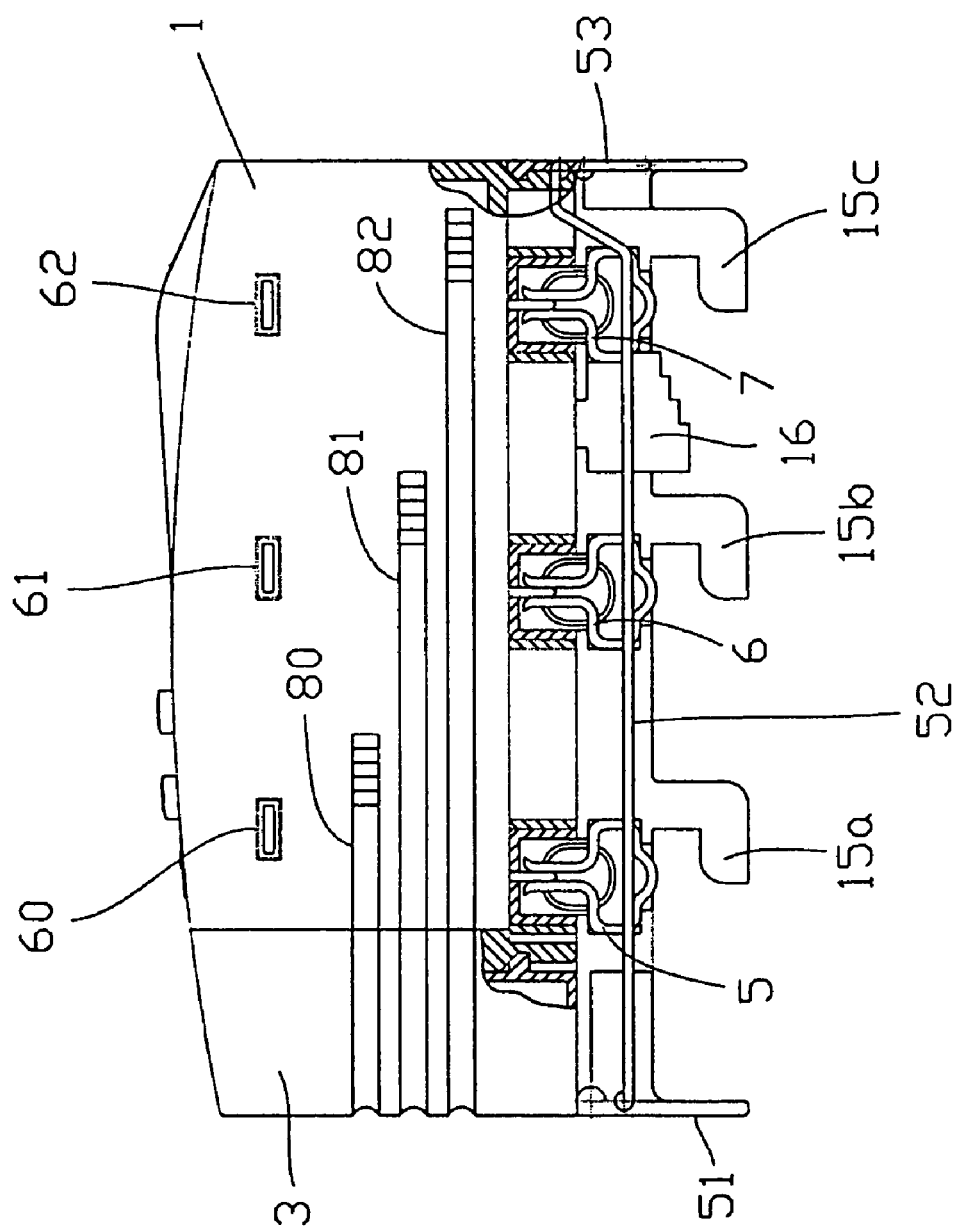
FIG. 7 shows a schematic, partially cut open view of a circuit-breaking device.

Reference will now be made to FIGS. 6 and 7. With respect to the preceding figures same parts are designated with the same reference numerals in FIGS. 6 and 7.

FIG. 6 shows an embodiment modified over FIG. 1. In both FIG. 6 and FIG. 7 a portion of the lower switch part 2 is illustrated in a cut open view.

It can moreover be seen in FIG. 6 that the side walls 3a have approximately the same depth as the upper wall 3b of the connection module 3 so that the contact tongues 38, 39, 40 of the connection module 3 are entirely enclosed by the housing or the walls 3a, 3b respectively in an insulated manner.

In the embodiment according to FIGS. 6 and 7 the insulation safety of the individual parts is still further improved as compared to the embodiment according to FIG. 1 as will be described below. With reference to the upper switch part 1 shown in the embodiment according to FIGS. 6 and 7 a protective collar 20a, 22a, 24a is provided with respect to each contact 17, 18, 19 instead of the lateral cover brackets 20, 21. The protective collar according to the embodiment as illustrated preferably has an opening surface being at least slightly larger than the surface of the housing sections 12, 13, 14 which include the slots 12, 13, 14. The height of the protective collars 20a, 22a, 24a is selected to be at least as high as the contacts 17, 18, 19 downwardly projecting from the upper switch part 1, preferably even higher than the same. Thus, the contacts 17, 18, 19 are laterally entirely covered by the protective collars 20a, 22a, 24a in an insulated manner so that, when the upper switch part 1 is withdrawn, e.g. for replacing it by a new upper switch part 1, the danger of touching the area between the housing sections 12a, 13a, 14a or the contacts 17, 18, 19 with a hand is completely eliminated, even when the busbars are current-carrying.

In correspondence with the illustration in FIGS. 6 and 7 the connection module 3 is preferably elongated with respect to its side walls arranged parallel to each other, whereof only side wall 3a is depicted in FIGS. 6 and 7, such that the contact tongues 38, 39, 40 (FIG. 1) are likewise laterally covered. When the device is in operation, this results in the prevention of an access to the contact tongues 38, 39 40 even with a slight pivoting counter-clockwise movement of the connection module 3 in FIG. 1 or FIG. 6 respectively, i.e. that the safety against contact is very high, even if it can be assumed that already a slight pivoting counter-clockwise movement of the connection module 3 according to FIG. 1 entails that the contact tongues 38, 39, 40 would be currentless. This means, in other words, that the side walls 3a of the connection module 3 according to the embodiment shown in FIGS. 6 and 7 have such a length in the direction of the upper switch part that the contact tongues 38, 39, 40 are laterally covered or that the contact tongues 38, 39, 40 even lie inside these walls or, respectively, that the side walls 3a at least slightly project over the contact tongues 38, 39, 40 in the direction of the upper switch part 1. Thus, in the operating state (FIG. 7), the connection module is designed with respect to its housing including the side walls 3a such that it covers a lateral subsection designated with 1c, which comprises the contact openings 35, 36, 37 and the locking opening 46, or is placed upon the same. The subsection 1c of the housing therefore has a smaller cross-sectional surface than the rest of the housing of the upper switch part 1, as can be inferred from FIG. 6.

FIG. 7 shows a representation of the circuit-breaking device in the operating position, i.e. in the position in which the upper switch part 1, the lower switch part 2 and the connection module 3 are permanently connected or interlocked with each other, and in which position the contacts 17, 18, 19 are inserted into the counter-contacts or counter-contact tongues 5, 6, 7.

Figure 8:
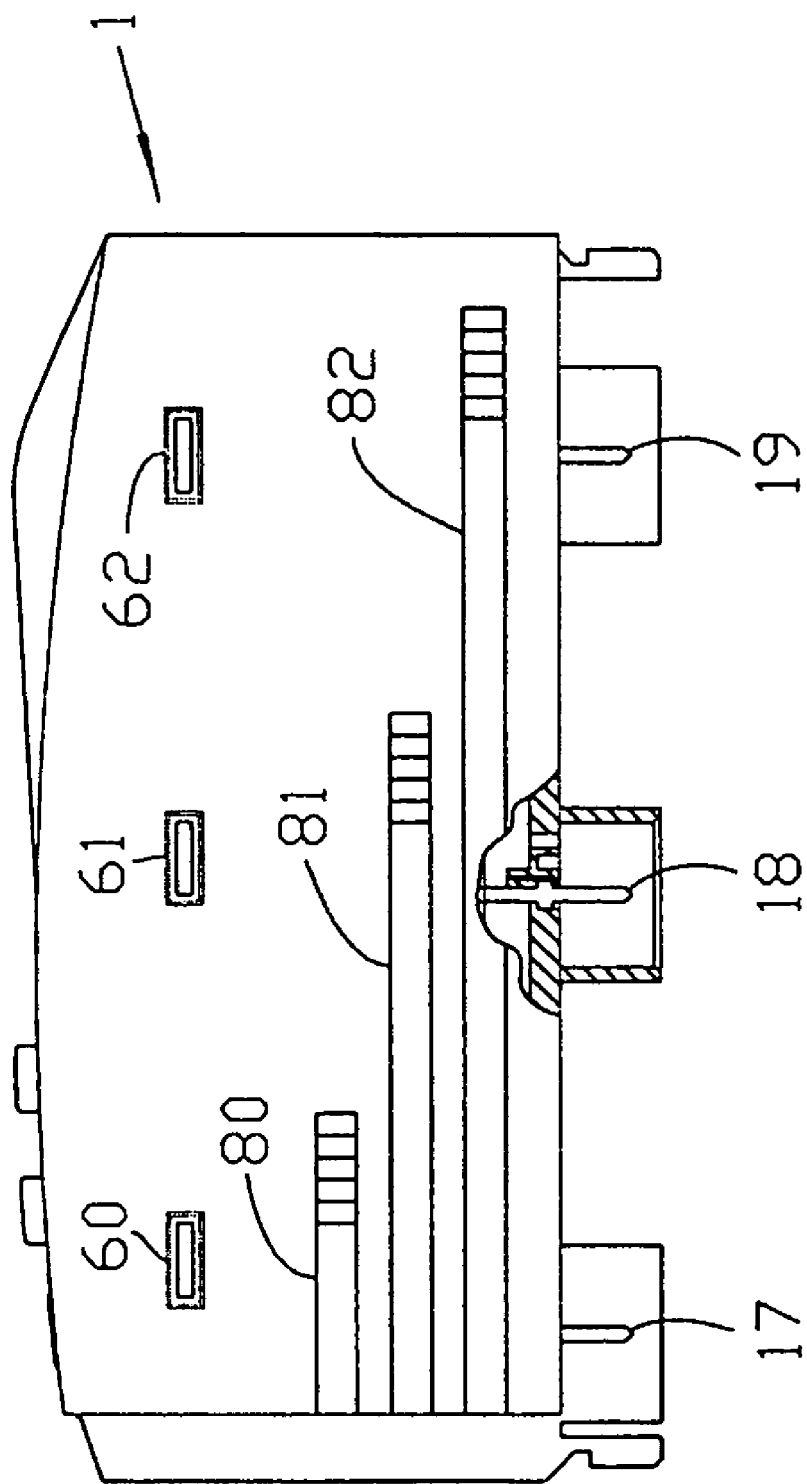
FIG. 8 shows a view of an upper switch part for illustrating the mounting of the contacts in correspondence with FIG. 1 or FIG. 6.
Figure 9:
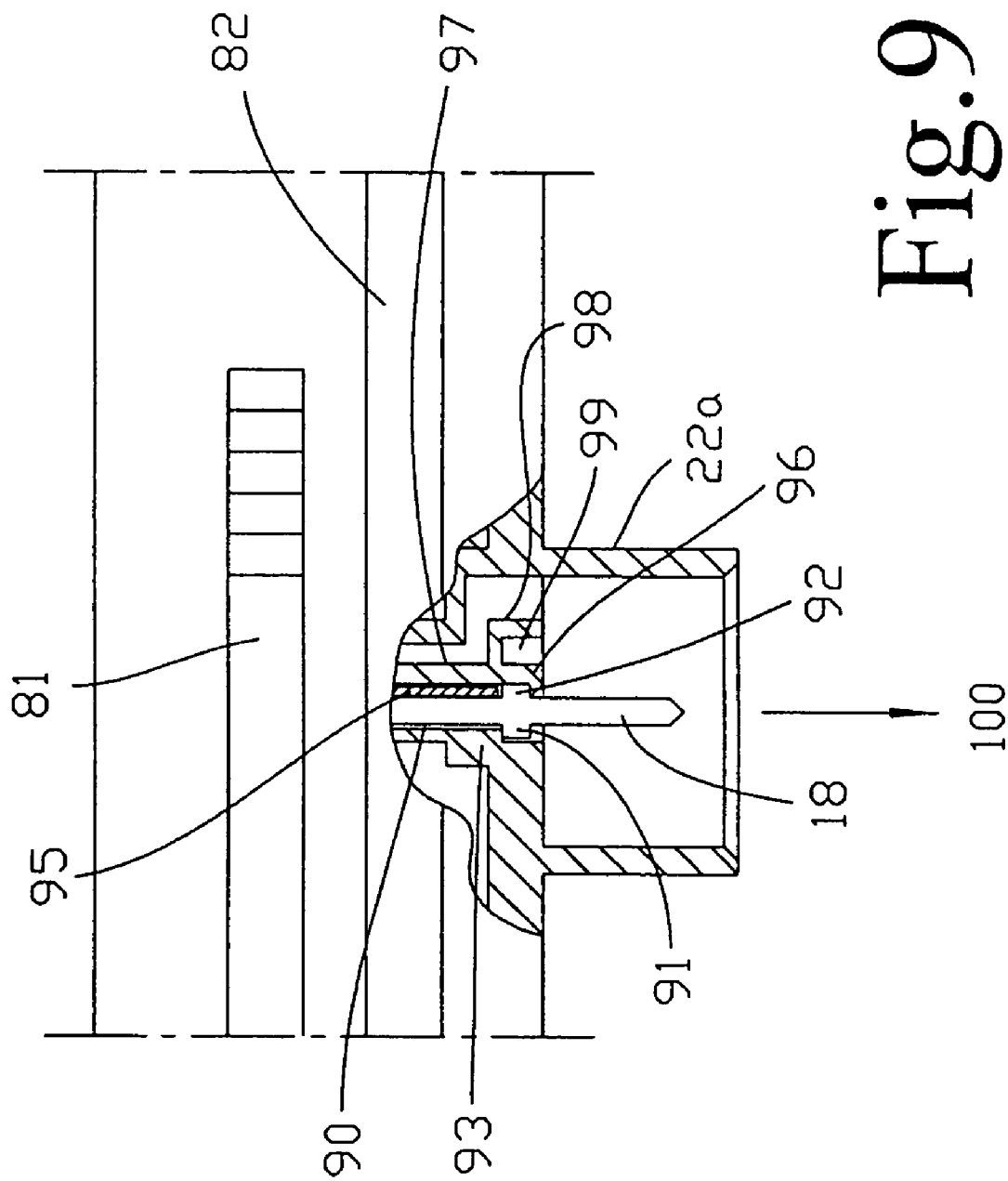
FIG. 9 shows a detailed view in correspondence with FIG. 8.

FIG. 8 is a lateral view of an upper switch part 1 which preferably corresponds to the embodiment according to FIG. 6. By cutting away the side wall, the mounting of one of the contact elements 18 is depicted. FIG. 9 is a detailed view for illustrating a preferred embodiment of the mounting of the contacts 17, 18, 19, with the view concentrating on contact 18. As had already been explained above, it may be possible or required with a parallel arrangement of a motor protection switch and a contactor corresponding to FIG. 5c or a reversible contactor combination corresponding to FIG. 5d to remove individual ones of the contacts 17, 18, 19 from the upper switch part and to produce an electrical connection between the adjacent units via the contacts located in slots 60, 61, 62 instead. According to a preferred embodiment the contacts 17, 18, 19 are, for this reason, detachably mounted on the lower switch part 1 wherein, according to the embodiment of FIG. 8, when the contacts 17, 18, 19 are inserted, the same are enclosed by the protective brackets 20, 21 and so on or entirely by the pedestals 20a, 22a, 24a so as to ensure an insulated arrangement of these contacts.

For facilitating the illustration those reference numerals not referring to the mounting of the contact 18 have been omitted in FIGS. 8 and 9.

According to a preferred embodiment of the circuit-breaking device in correspondence with FIG. 9 a substantially vertically extending slot for each contact 17, 18, 19 is formed on the lower side of the upper switch part, which is designated with reference numeral 90 in FIG. 9. Each contact 17, 18, 19 preferably has two webs 91, 92 laterally projecting away to the longitudinal plane of the contacts, whereof at least one of the webs 91 is received in a step-like slot receptacle of the upper switch part, said step-like receptacle being designated with 93. With this mounting variant of the contact 18 a strip or web 95 is provided on the side opposite the step-like receptacle 93, which is preferably made of an insulating material, said web 95 being made either of an insulating material or an electrically conducting material and, in the latter case, producing an electrical contact to the contact 18. If the web or strip 95 is made of an insulating material, the electrical contact to the contact 18 is provided above said contact 18 in a manner not illustrated in more detail.

A locking hook 96 serves to fix the contact 18, wherein said locking hook 96 is attached on a web 97 or, as an integral part of the web 97, projects away in a downward direction in the manner shown in FIG. 9, said web 97 being laterally adjustable. A section 98 forking off from the locking hook 96 is provided on the web 97 which is spaced away from the locking hook 96 by a slot 99, as can be seen in FIG. 9.

The slot 99 serves to receive a tool, e.g. a screwdriver, by means of which the web 97 with the locking hook 96 in FIG. 9 can be displaced away from the contact 18 towards the right, so that the web 92 of the contact 18 may be released with respect to the locking hook 96 and contact 18 may be displaced out of the upper switch part downwardly in the direction of an arrow 100. Thus, when the upper switch part 1 is placed upon the lower switch part 2, no contact to the contact 6 is possible, but the contact element 18 is rather plugged into the contact located inside slot 61 so as to produce a bridge to the adjacent module.

It is essential that an unlockable locking means is provided for mounting the contacts 17, 18, 19 which allows the locking and the removal of the contacts 17, 18, 19 according to need, i.e. of one or more of these contacts, and which ensures the locking of these contacts in case of need.

The invention claimed is:

1. The circuit-breaking device consisting of a lower switch part (2) to be brought into an electrical contact with current busbars,
    an upper switch part (1) attachable to the lower switch part (2), comprising at least one fuse link, switch module, or contactor, and comprising a connection module (3) for at least one outgoing conductor (42),
    wherein the lower switch part (2) includes contact elements (5, 6, 7) being in an electrical contact with the current busbars (9, 10, 11), which are contactable by plug contacts (17, 18, 19) of the upper switch part (1) in a touch-safe manner via an access slot (12, 13, 14) in an upper surface of the lower switch part (2), and
    wherein the connection module (3) is pivotably mounted (50) at the side of the upper switch part (1) or the lower switch part (2) and is provided with laterally into the upper switch part (1) retractable electrical contacts (38, 39, 40) associated with each outgoing conductor (42).

2. The circuit-breaking device according to claim 1, characterized in that
    the upper switch part (1) comprises lateral openings (35, 36, 37) for receiving in a touch-safe manner counter-contacts arranged inside the upper switch part (1) for the electrical contacts (38, 39, 40) of the connection module (3).

3. The circuit-breaking device according to claim 2, characterized in that
    the lateral openings (35, 36, 37) are provided to be laterally offset to each other.

4. The circuit-breaking device according to claim 1, characterized in that
    a locking means (52, 53, 53a, 53b) controlled by the pivoting movement of the connection module (3) is provided between the upper switch part (1) and the lower switch part (2).

5. The circuit-breaking device according to claim 1, characterized in that
    the plug contacts (17, 18, 19) of the upper switch part (1) project on the lower side thereof and are at least laterally bordered by guide brackets or protective brackets (20, 21, 22, 23, 24, 25).

6. The circuit-breaking device according to claim 1, characterized in that
    the connection module (3) comprises at least one latching or locking means (45; 52, 53) to be brought into an interlocking engagement with the upper switch part (1) or the lower switch part (2).

7. The circuit-breaking device according to claim 1, characterized in that
    the upper switch part (1) comprises a housing (1a) wherein lateral openings or slots (60, 61, 62) for receiving contact tongues (64, 65) are provided.

8. The circuit-breaking device according to claim 1, characterized in that
    the plug contacts (17, 18, 19) of the upper switch part (1) are arranged in a removable manner.

9. The circuit-breaking device according to claim 7, characterized in that
    the plug contacts (17, 18, 19) are matched with the size of the lateral openings (60, 61, 62) provided laterally in the housing (1a) of the upper switch part (1) and of the counter-contacts provided therein.

10. The circuit-breaking device according to claim 1, characterized in that
    the connection module (3) is connected with the lower switch part (2) in an articulated manner.

11. The circuit-breaking device according to claim 10, characterized in that
    a second locking means (52, 53) is provided.

12. The circuit-breaking device according to claim 11, characterized in that
    the second locking means is clutched to an adjustable lever (52) which controls a locking lever (53) arranged on the side of the lower switch part (2) averted from the connection module (3), the locking lever (53) being displaceable to have a locking engagement with the upper switch part (1).

13. The circuit-breaking device according to claim 12, characterized in that
    the lever (52) is mechanically clutched with the connection module (3).

14. The circuit-breaking device according to claim 1, characterized in that each lower switch part (2) comprises latching feet (13, 14, 15) for gripping underneath current busbars (15*a*, 15*b*, 15*c*) and, if required, a locking or clamping means (16).

15. The circuit-breaking device according to claim 1, characterized in that
at least two circuit-breaking device units are arranged on current busbars (9, 10, 11) to lie side by side and are laterally electrically connected with each other by contact tongues (64, 65).

16. The circuit-breaking device according to claim 15, characterized in that
each connection module (3) comprises spring-type terminals (34) for a connection of outgoing conductors (42).

17. The circuit-breaking device according to claim 7, characterized in that
the device comprises at least one switch (71) and one contactor (70) arranged on the busbars (9, 10, 11) to lie parallel to each other, wherein the switch (71) and the contactor (70) are electrically connected by contact tongues (64, 65) provided between the switch (71) and the contactor (70).

18. The circuit-breaking device according to claim 17, characterized in that
at least one switch (71), one contactor (70) and one reversible contactor (73) are provided whose electrical connection is accomplished by contact tongues (64, 65) inserted in the lateral openings (60, 61, 62) between the the contactor and reversible contactor.

19. The circuit-breaking device according to claim 17, characterized in that
a combination formed of a circuit breaker (71), a contactor (70) and/or a reversible contactor (71) is provided at least in a partial series connection.

20. The circuit-breaking device according to claim 1, characterized in that
the plug contacts (17, 18, 19) of the upper switch part (1) are bordered by protective collars (20*a*, 22*a*, 24*a*).

21. The circuit-breaking device according to claim 1, characterized in that
the lower switch part (2) comprises protection chambers formed by housing sections (12*a*, 13*a*, 14*a*) for the contacts or contact tongues (5, 6, 7) arranged in the lower switch part (2), such that these contacts (5, 6, 7) are placed in the lower switch part (2) in a touch-safe manner.

22. The circuit-breaking device according to claim 1, characterized in that
the connection module (3) comprises side walls (3*a*) laterally covering the contact tongues (38, 39, 40) provided in the connection module (3) or, if required, projecting over the contact tongues.

23. The circuit-breaking device according to claim 22, characterized in that
the side walls (3*a*) and the upper surface (3*b*) including an opening (47) at least partially border a housing connecting part (1*c*) of the upper switch part (1) in the operating state.

24. The circuit-breaking device according to claim 1, characterized in that
the upper switch part (1) comprises on its lower side a detachable locking means (92, 96, 97, 98) associated with each plug contact (17, 18, 19), respectively.

25. The circuit-breaking device according to claim 24, characterized in that
a receptacle (93, 98) is associated with each plug contact (17, 18, 19).

26. The circuit-breaking device according to claim 24 or 25, characterized in that
each plug contact (17, 18, 19) is provided with thrust bearings (91, 92).

27. The circuit-breaking device, according to claim 1, wherein said plug contacts (17 18, 19) are removable contacts (17, 18, 19) associated with said contact elements (5, 6, 7) in the lower switch part (2) which are provided stationary,
wherein each removable contact (17, 18, 19) is associated stationary with a latching or locking means (92, 95, 96, 97) which retains the removable contacts (17, 18, 19) in their operating position and which is unlockable for the removal of the removable contacts (17, 18, 19).

28. The circuit-breaking device according to claim 27, characterized in that
the latching means (92, 95, 96, 97) is formed unlockable as a tool for releasing the respective removable contact (17, 18, 19).

* * * * *